United States Patent
Li et al.

(10) Patent No.: US 12,133,293 B2
(45) Date of Patent: Oct. 29, 2024

(54) OFF-LINE PROFILE PROVISIONING FOR WIRELESS DEVICES

(71) Applicant: Apple Inc., Cupertino, CA (US)

(72) Inventors: Li Li, Los Altos, CA (US); Jean-Marc Padova, San Francisco, CA (US); Najeeb M. Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 17/935,081

(22) Filed: Sep. 23, 2022

(65) Prior Publication Data

US 2023/0020828 A1     Jan. 19, 2023

Related U.S. Application Data

(63) Continuation of application No. 17/662,632, filed on May 9, 2022.

(Continued)

(51) Int. Cl.

| | |
|---|---|
| *H04W 8/26* | (2009.01) |
| *H04W 8/18* | (2009.01) |
| *H04W 12/03* | (2021.01) |
| *H04W 12/0431* | (2021.01) |
| *H04W 12/06* | (2021.01) |

(52) U.S. Cl.
CPC ........... *H04W 8/265* (2013.01); *H04W 8/183* (2013.01); *H04W 12/03* (2021.01); *H04W 12/0431* (2021.01); *H04W 12/068* (2021.01)

(58) Field of Classification Search
CPC ..... H04W 8/265; H04W 8/183; H04W 12/03; H04W 12/0431; H04W 12/068; H04W 12/35; H04W 12/40; H04W 8/205; H04W 12/069; H04W 24/02
See application file for complete search history.

(56) References Cited

U.S. PATENT DOCUMENTS 9,831,903 B1 * 11/2017 Narasimhan ........ H04M 17/103
9,843,585 B2 * 12/2017 Haggerty .............. H04W 12/06
(Continued)

FOREIGN PATENT DOCUMENTS

KR           101891326 B1 * 8/2018

*Primary Examiner* — Ahmed Elallam
(74) *Attorney, Agent, or Firm* — DICKINSON WRIGHT RLLP (57) ABSTRACT

This application describes a phased approach to provision eSIM profiles to a wireless device. Credentials are preloaded to an eUICC during manufacture of the eUICC and used subsequently to load eSIM profiles to the eUICC without requiring an active, real-time connection to an MNO provisioning server. Multiple bound profile packages (BPPs) can be pre-generated and encrypted by MNO provisioning servers for an eUICC and transferred to a BPP aggregator server before assembly of the eUICC in a respective wireless device. A local provisioning server in a manufacturing facility mutually authenticates and connects to the BPP aggregator server to download and store one or more of the encrypted BPPs for later installation on the eUICC. The local provisioning server subsequently mutually authenticates and connects to the eUICC to load at least one of the one or more pre-generated, encrypted BPPs to the eUICC during assembly and/or testing of the wireless device.

20 Claims, 7 Drawing Sheets

Related U.S. Application Data (60) Provisional application No. 63/186,716, filed on May 10, 2021.

(56) References Cited

U.S. PATENT DOCUMENTS

| | | | | |
|---|---|---|---|---|
| 9,942,755 B2* | 4/2018 | Yang | ................. | H04W 12/08 |
| 9,961,060 B2* | 5/2018 | Nix | ................. | H04L 9/0869 |
| 9,998,925 B2* | 6/2018 | Yang | ................. | H04W 12/35 |
| 10,057,760 B2* | 8/2018 | Yang | ................. | H04W 12/02 |
| 10,141,966 B2* | 11/2018 | Narasimhan | ................. | H04M 17/026 |
| 10,306,578 B2* | 5/2019 | Khan | ................. | H04W 12/06 |
| 10,367,810 B2* | 7/2019 | Li | ................. | H04L 63/123 |
| 10,394,674 B2* | 8/2019 | Li | ................. | G06F 21/602 |
| 10,396,981 B2* | 8/2019 | Yang | ................. | H04W 12/0431 |
| 10,397,770 B2* | 8/2019 | Li | ................. | H04W 8/183 |
| 10,462,654 B2* | 10/2019 | Yang | ................. | H04W 12/35 |
| 10,498,531 B2* | 12/2019 | Yang | ................. | H04L 9/3273 |
| 10,735,944 B2* | 8/2020 | Syed | ................. | H04L 67/1014 |
| 10,805,789 B2* | 10/2020 | Ahmed | ................. | H04W 12/00 |
| 10,856,148 B2* | 12/2020 | Li | ................. | H04L 63/083 |
| 10,887,318 B2* | 1/2021 | Lee | ................. | H04L 63/0853 |
| 10,965,470 B2* | 3/2021 | Park | ................. | H04L 63/12 |
| 10,985,926 B2* | 4/2021 | Yang | ................. | H04W 12/42 |
| 11,025,611 B2* | 6/2021 | Park | ................. | H04L 63/08 |
| 11,039,298 B2* | 6/2021 | Lee | ................. | H04L 63/20 |
| 11,039,311 B2* | 6/2021 | Park | ................. | H04L 9/3239 |
| 11,082,855 B2* | 8/2021 | Khan | ................. | H04W 12/069 |
| 11,102,017 B2* | 8/2021 | Yang | ................. | H04W 4/70 |
| 11,129,013 B2* | 9/2021 | Auer | ................. | H04W 8/183 |
| 11,146,568 B2* | 10/2021 | Park | ................. | H04W 8/205 |
| 11,197,150 B2* | 12/2021 | Yoon | ................. | H04W 8/245 |
| 11,463,883 B2* | 10/2022 | Goyal | ................. | H04L 67/53 |
| 11,503,457 B2* | 11/2022 | Chaugule | ................. | H04M 17/10 |
| 11,516,732 B2* | 11/2022 | Dreiling | ................. | H04W 8/065 |
| 11,689,921 B2* | 6/2023 | Li | ................. | H04L 67/55 |
| | | | | 455/411 |
| 11,729,618 B2* | 8/2023 | Kang | ................. | H04W 12/35 |
| | | | | 370/338 |
| 11,736,273 B2* | 8/2023 | Yang | ................. | H04W 12/43 |
| 11,785,444 B2* | 10/2023 | Indurkar | ................. | H04L 67/12 |
| | | | | 455/418 |
| 11,805,397 B2* | 10/2023 | Li | ................. | H04W 4/50 |
| 11,889,586 B2* | 1/2024 | Lee | ................. | H04L 63/0853 |
| 11,917,508 B2* | 2/2024 | Holmes | ................. | H04W 4/60 |
| 11,943,624 B2* | 3/2024 | Padova | ................. | H04W 12/72 |
| 2022/0086622 A1* | 3/2022 | Laina Farell | ................. | H04W 12/40 |
| 2022/0141642 A1* | 5/2022 | Boyapalle | ................. | H04W 8/18 |
| | | | | 455/418 |
| 2022/0360978 A1* | 11/2022 | Li | ................. | H04W 12/0431 |
| 2024/0107483 A1* | 3/2024 | Voyer | ................. | H04W 12/40 |

* cited by examiner

OFF-LINE PROFILE PROVISIONING FOR WIRELESS DEVICES

CROSS-REFERENCE TO RELATED APPLICATIONS

The present application is a continuation of U.S. application Ser. No. 17/662,632, filed May 9, 2022, entitled "OFF-LINE PROFILE PROVISIONING FOR WIRELESS DEVICES," which claims the benefit of U.S. Provisional Application No. 63/186,716, entitled "PROFILE PROVISIONING FOR WIRELESS DEVICES," filed May 10, 2021, the contents of all of which are incorporated by reference herein in their entirety for all purposes.

FIELD

The described embodiments set forth techniques for electronic subscriber identity module (eSIM) profile provisioning for a wireless device, including a phased approach for provisioning bootstrap and/or fully functional eSIM profiles.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. Additionally, some cellular-capable wireless devices, such as wearable wireless devices, home automation Internet of Things (IoT) wireless devices, and cellular wireless equipped vehicles may not support UICCs.

Profiles, including bootstrap provisioning profiles with limited functionality and eSIM profiles with full cellular service capability, can be downloaded to an eUICC of a mobile device from a network-based server as an encrypted bound profile package (BPP). Preloading profiles to an eUICC before assembly may be infeasible or impractical, as the target wireless device can be unknown when the eUICC is manufactured; and, as manufacturing of the eUICC can occur well in advance of assembly and manufacture of the target wireless device, preloaded bootstrap profiles on the eUICC to use for subsequent downloading of fully functional profiles can be outdated and difficult to modify once the eUICC is manufactured and delivered to a manufacturing facility for the wireless device. Encrypting and distributing profiles in real-time after purchase of a wireless device, e.g., during initialization by a user, can require an available data connection and delay initial setup resulting in a suboptimal user experience. A phased approach to allow off-line profile provisioning can improve customization of the wireless device for the user.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for electronic subscriber identity module (eSIM) profile provisioning for a wireless device, including a phased approach to provision bootstrap eSIM profiles and/or fully functional eSIM profiles to a wireless device. Wireless devices that support electronically downloadable profiles, e.g., i) on-demand eSIMs or ii) one or more limited functionality provisioning eSIMs for initialization and subsequent loading of fully functional cellular eSIMs on an eUICC, are becoming more prevalent. Efforts are underway to standardize distribution of profiles to wireless devices using a multi-phase approach that includes a first phase during manufacture and firmware configuration of an eUICC for a wireless device and a second phase during assembly and/or testing of the eUICC in the wireless device at a device manufacturing facility. An original equipment manufacturer (OEM) of the wireless device may have the flexibility to load bootstrap eSIM profiles and/or mobile network operator (MNO) eSIM profiles during manufacture, assembly, and/or testing of the wireless device at an OEM manufacturing facility. Multiple sets of transaction credentials can be preloaded to the eUICC of the wireless device during manufacture of the eUICC, and at least a portion of the transaction credentials can be used subsequently to load one or more bootstrap profiles and/or fully functional cellular service eSIM profiles to the eUICC of the wireless device without requiring an active, real-time connection to a provisioning server of an MNO. Multiple bound profile packages (BPPs) can be pre-generated and encrypted by various mobile network operator (MNO) provisioning servers, e.g., subscription management data preparation (SM-DP+) servers, for each eUICC and transferred for secure storage to one or more BPP aggregator servers in advance of assembly of the eUICCs associated with the encrypted BPPs in their respective wireless devices at an associated manufacturing facility. A local provisioning server in the manufacturing facility can mutually authenticate with and securely connect to at least one of the one or more BPP aggregator servers to download and store one or more of the encrypted BPPs for later installation on respective eUICCs with which the encrypted BPPs have been associated when pre-generated. The local provisioning server in the manufacturing facility can subsequently mutually authenticate with and securely connect to an eUICC of a wireless device to load at least one of the one or more pre-generated, encrypted BPPs to the eUICC during assembly and/or testing of the wireless device. A root certificate of the local provisioning server in the manufacturing facility server can be preloaded to the eUICC during chip manufacturing of the eUICC and later used by the eUICC for authentication of the local provisioning server. Authentication of the local provisioning server can be required by the eUICC before downloading encrypted BPPs to the eUICC. The local provisioning server can also authenticate the eUICC, e.g., by checking signed payloads received from the eUICC to validate a certificate chain against a standardized, field-deployed root certificate, as well as by checking eUICC signatures that accompany the signed payloads. Authentication of the eUICC by the local provisioning server can be required to ensure loading encrypted BPPs to the properly associated and authentic eUICC. The eUICC can generate an installation notification for an eSIM profile after the eSIM profile is extracted from the BPP and installed in the eUICC of the wireless device. The installation notification can subsequently be sent to an applicable MNO SM-DP+ server associated with the eSIM profile, e.g., when the wireless device is initialized after purchase by a user of the wireless device. Multiple eSIM profiles from multiple BPPs can be installed on the eUICC, and multiple notifications of eSIM profile installation can be sent during (and/or after) initialization of the wireless device that includes the eUICC on which the eSIM profiles are installed. Different types of profiles can be associated with the same eUICC, such as provisioning profiles, MNO-specific profiles, different revisions of MNO-specific profiles, and the like. The SM-DP+ servers need not communicate directly with the local provisioning server in the manufacturing facility but instead can communicate with a BPP aggregator server via one or more standardized interfaces. Security of the encrypted BPPs can be maintained by requiring one-time use cryptographic key pairs, where secret (private) keys are maintained by the eUICC and SM-DP+ respectively and corresponding public keys provided to each other for secure encryption and decryption of the encrypted BPPs in which the eSIM profiles are included.

These and other embodiments are discussed below with reference to FIGS. 1-5; however, those skilled in the art will readily appreciate that the detailed description given herein with respect to these figures is for explanatory purposes only and should not be construed as limiting.

Figure 1:
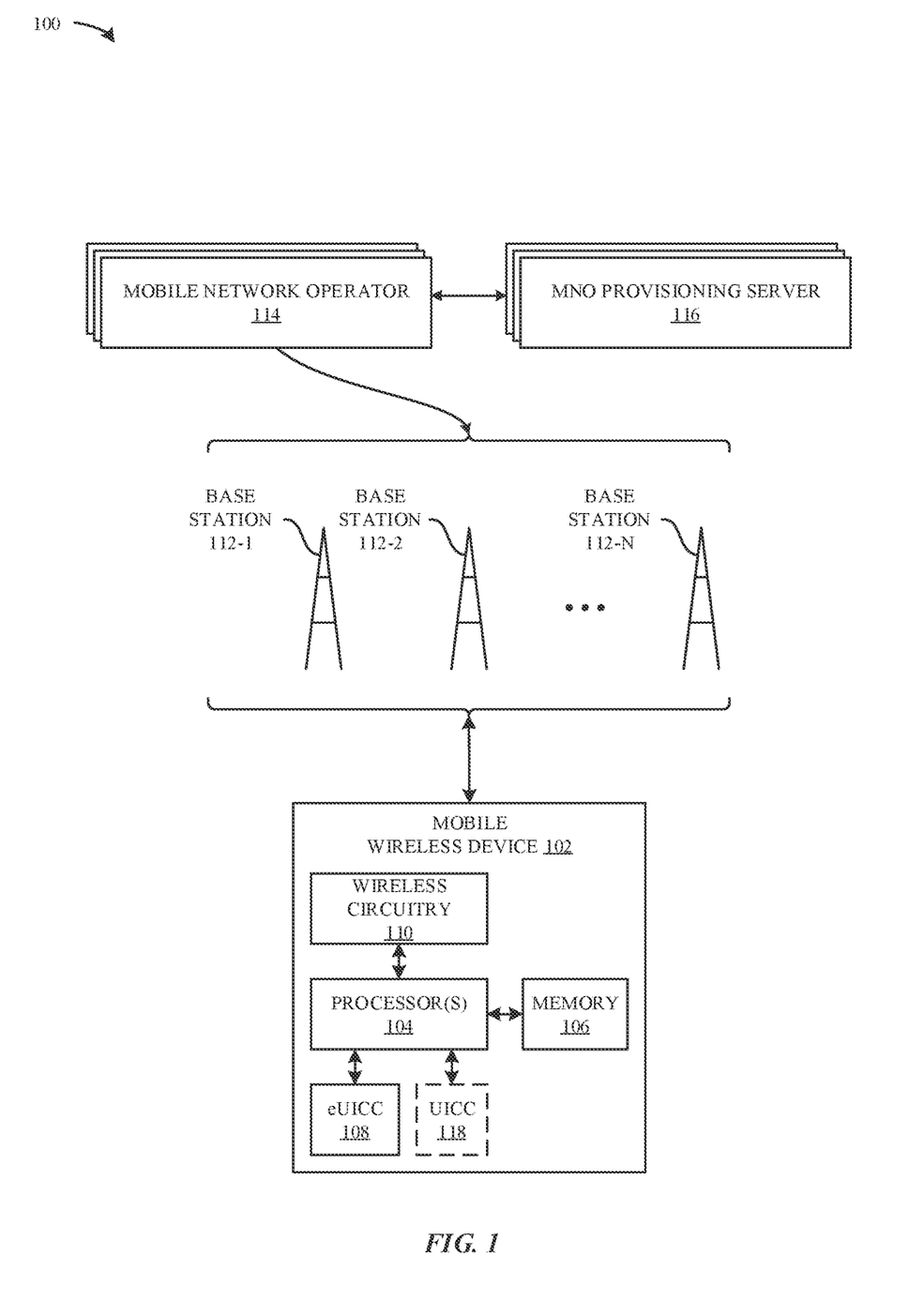
FIG. 1 illustrates a block diagram of different components of an exemplary system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®) or a cellular-capable wearable device (e.g., an Apple Watch), the base stations 112-1 to 112-$n$ can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO 114, an eSIM is reserved for subsequent download and installation to the eUICC 108. In some embodiments, the eUICC 108 obtains one or more eSIMs from one or more associated provisioning servers 116. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel. In some embodiments, a server aggregates a set of one or more encrypted bound profile packages (BPPs) for an eUICC 108, each BPP including a profile intended for the eUICC 108. In some embodiments, a local provisioning server in a manufacturing facility obtains at least one of the encrypted BPPs to load to the eUICC 108 during manufacture of an associated mobile wireless device 102 in which the eUICC 108 is assembled. In some embodiments, one or more provisioning eSIMs and/or fully functional eSIMs are pre-loaded on the eUICC 108 of the mobile wireless device 102 during manufacture, assembly, or testing of the mobile wireless device 102. In some embodiments, at least one limited functionality, bootstrap provisioning eSIM profile is pre-loaded to the eUICC 108 of the mobile wireless device 102 during manufacturing after assembly of the eUICC 108 in the mobile wireless device 102. In some embodiments, at least one fully functional eSIM is pre-loaded to the eUICC 108 of the mobile wireless device 102 during manufacturing after assembly of the eUICC 108 in the mobile wireless device 102. In some embodiments, at least one fully functional eSIM is loaded to the eUICC 108 of the mobile wireless device 102 after receipt by a user of the mobile wireless device 102, e.g., during initial setup of the mobile wireless device 102 or after a reset and re-initialization of the mobile wireless device 102. The at least one fully functional eSIM can be provided to the eUICC 108 of the mobile wireless device, in some embodiments, via a secure data connection established using a bootstrap provisioning eSIM profile pre-loaded on the eUICC 108.

Figure 2:
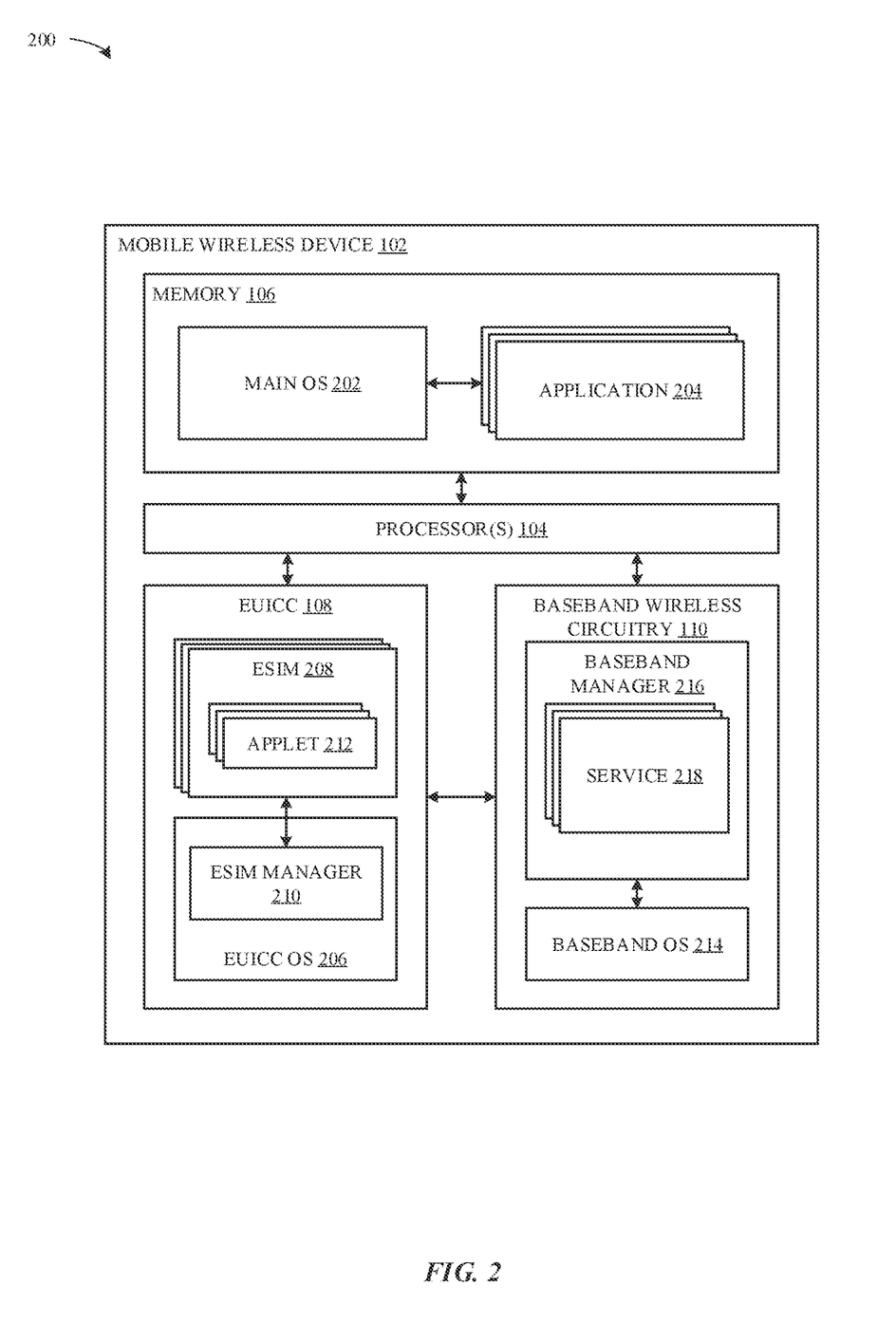
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
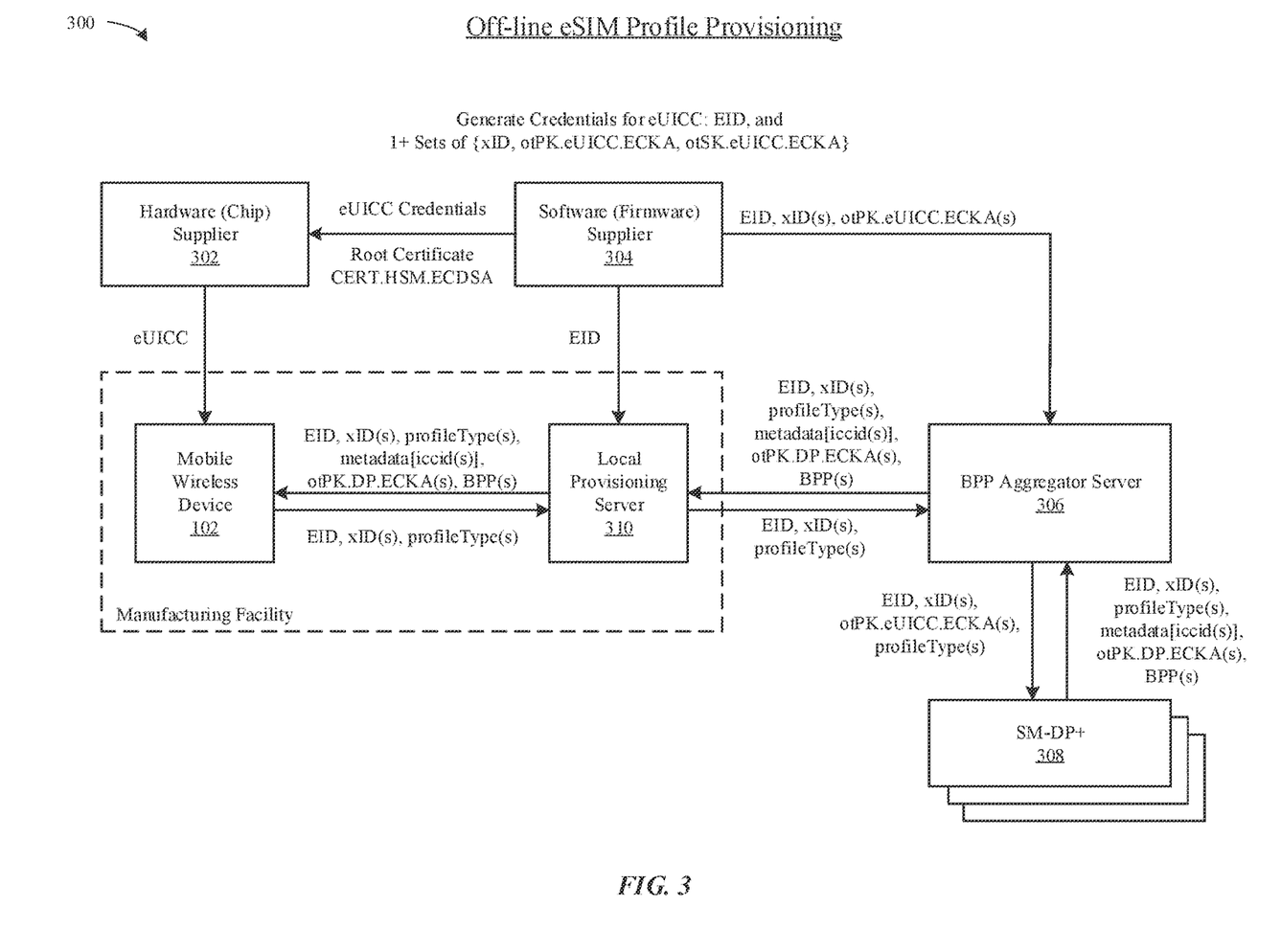
FIG. 3 illustrates a block diagram of an exemplary off-line eSIM provisioning process for a wireless device, according to some embodiments.

FIG. 3 illustrates a block diagram 300 of an exemplary off-line eSIM provisioning process for a mobile wireless device 102. Manufacturing of an eUICC 108 for a mobile wireless device 102, including loading of firmware to the eUICC 108, can occur separately (in time and location) from manufacturing of the mobile wireless device 102. A hardware (chip) supplier 302 can manufacture a quantity of eUICCs 108 and load firmware obtained from a software (firmware) supplier 304 into the manufactured eUICCs 108. Each eUICC 108 can be assigned a unique eUICC identifier (EID) value, which can be communicated by the software supplier 304 to the hardware supplier 302 as a set of EID values, each EID value to be associated individually with a manufactured eUICC 108. The software supplier 304 can also communicate the set of EID values to a local provisioning server 310 located at a contract manufacturing facility (factory) in which mobile wireless devices 102 are manufactured, assembled, pre-loaded with firmware/software, and/or tested. The software supplier 304 can generate one or more sets of credentials and associate the one or more sets of credentials with a unique EID value to be assigned to a particular eUICC 108 that will be assembled later into a mobile wireless device 102 at the manufacturing facility. Each set of credentials can include a transaction identifier (xID) value and a one-time use eUICC public/private key pair {otPK.eUICC.ECKA, otSK.eUICC.ECKA} specifically generated for use by the eUICC 108 identified by the accompanying EID value. Multiple sets of credentials can be generated for the same EID value. The one or more sets of credentials can be securely communicated by the software supplier 304 to the hardware supplier 302 and loaded to the eUICC 108 by the hardware supplier 302. In addition, the software supplier 304 can provide a root certificate for the local provisioning server 310, e.g., CERT.HSM.ECDSA, to the hardware supplier 302 to load into the eUICC 108 for later use by the eUICC 108 to authenticate the local provisioning server 310. The software supplier 304 can further communicate EID values, and for each EID value, associated xID values and one-time use eUICC public keys (otPK.eUICC.ECKA(s)) to a bound profile package (BPP) aggregator 306 server. The one-time use eUICC private keys (otSK.eUICC.ECKA(s)) are only provided to the hardware supplier 302 for secure loading into the eUICC 108 and are not made available to other entities to maintain secrecy of the one-time use eUICC private keys to ensure encryption security.

The BPP aggregator server 306 communicates with one or more provisioning servers, e.g., SM-DP+ 308 servers, of one or more MNOs to obtain one or more encrypted BPPs for an eUICC 108 associated with an EID value. The BPP aggregator server 306 can provide, to the one or more SM-DP+

308 servers, the EID value of the eUICC 108 along with one or more associated transaction identifier (xID) values, one-time use eUICC public keys (otPK.eUICC.ECKA(s)), and, in some instances, one or more preferred profile types (profileType(s)). Each particular xID value for an eUICC 108 is sent to only one of the SM-DP+ 308 servers along with an associated one-time use eUICC public key otPK.eUICC.ECKA and optionally a requested profileType value. Example profileType values can include a generic provisioning profile, a provisioning profile for a specific MNO, an eSIM profile of a particular standard (e.g., 4G-LTE, 5G, etc.), an eSIM profile of a particular revision, etc. The one or more SM-DP+ 308 servers can generate and return encrypted BPPs. Each encrypted BPP can be generated by an SM-DP+ 308 server using a distinct one-time use eUICC public key, otPK.eUICC.ECKA, and a one-time use server private key, otSK.DP.ECKA, generated by the SM-DP+ 308 server. The SM-DP+ 308 server that generated the encrypted BPP can return, to the BPP aggregator server 306, the encrypted BPP along with a one-time use server public key, otPK.DP.ECKA, corresponding to the one-time use server private key, otSK.DP.ECKA, used for encryption of the BPP. As the encrypted BPP provided to the BPP aggregator server 306 is encrypted using the one-time use eUICC public key, otPK.eUICC.ECKA, and the BPP aggregator server 306 does not have access to the corresponding one-time use eUICC private key, otSK.eUICC.ECKA, which is maintained secretly by the associated eUICC 108, the BPP aggregator server 306 cannot read the encrypted BPP data. Some metadata from the BPP can be provided by the SM-DP+ 308 in an unencrypted (readable) format along with the encrypted BPP to the BPP aggregator server 306, such as an integrated circuit card identifier (ICCID) value included in the BPP and used to identify the profile in the BPP. The BPP aggregator server 306 can store the information obtained from the SM-DP+ 308 servers for later retrieval and uploading to a local provisioning server 310 that can upload to the respective eUICC 108.

Credentials and encrypted BPPs for an eUICC 108 can be generated in advance of assembly of the eUICC 108 into a mobile wireless device 102 saving time when one or more BPPs are loaded to the eUICC 108 of the mobile wireless device 102. The BPP aggregator server 306 can transfer one or more BPPs to the local provisioning server 310, either on demand, responsive to a request from the local provisioning server 310, or triggered by the BPP aggregator server 306 itself. In some embodiments, MNO network entities other than and/or in addition to the SM-DP+ 308 servers can interface with the BPP aggregator server 306 to obtain eUICC information, e.g., eID value, xID values, one-time use eUICC public keys, and profile types to generate and provide encrypted BPPs of specified profile types to the BPP aggregator server 306.

At a manufacturing facility where the eUICC 108 is installed into a mobile wireless device 102, the local provisioning server 310 can obtain a set of encrypted BPPs associated with the eID value and xID values of the eUICC 108 before assembly and/or testing of the eUICC 108 in a mobile wireless device 102. Real-time encryption of BPPs by MNO SM-DP+ 308 provisioning servers during assembly, configuration, and/or test of the mobile wireless device 102 is not required, because at least a portion of the credentials for the eUICC 108 are provided in advance via the BPP aggregator server 306 to the SM-DP+ 308 provisioning servers. Moreover, the BPP aggregator server 306 can provide the encrypted BPPs obtained from the SM-DP+ 308 provisioning servers to the local provisioning server 310 in the manufacturing facility before assembly of the eUICC 108 into the mobile wireless device 102. In fact, encrypted BPPs can be generated and available separately from and in advance of associated eUICCs 108 being supplied to the manufacturing facility. After (or in conjunction with) assembly of the eUICC 108 into the mobile wireless device 102, processing circuitry of the mobile wireless device 102 can obtain an associated EID value for the eUICC 108 and a set of available (unused) xID values stored in (and/or associated with) the eUICC 108. The processing circuitry of the mobile wireless device 102 can initiate a provisioning session with the local provisioning server 310, which in some embodiments can be co-located in the manufacturing facility, where the local provisioning server 310 previously received EID values for eUICCs 108 from the software supplier 304. In some embodiments, the local provisioning server 310 authenticates communication received from the mobile wireless device 102 by checking signed payloads that originate from the eUICC 108. For example the local provisioning server 310 can validate a certificate chain against a GSMA root certificate deployed in the field as well as an eUICC provided signature. The local provisioning server 310 can validate that the EID value obtained from the processing circuitry of the mobile wireless device 102 is consistent with an EID value previously obtained from the software (firmware) supplier 304. The local provisioning server 310 can select one or more of the xID values and return one or more encrypted BPPs with associated one-time use SM-DP+ server public keys, otPK.DP.ECKA(s), applicable metadata, e.g., ICCID values, the selected xID values, the EID value of the eUICC 108 of the mobile wireless device 102 and associated profileType values for the profiles included in the encrypted BPPs to the processing circuitry of the mobile wireless device 102. The processing circuitry of the mobile wireless device 102 can provide to the eUICC 108 all (or at least some) of the information obtained from the local provisioning server 310. The eUICC 108 can use the information to authenticate, validate, and/or install one or more eSIM profiles obtained via decryption of the BPPs using the one-time use SM-DP+ server public keys, otPK.DP.ECKA(s) in conjunction with one-time use eUICC private keys, otSK.eUICC.ECKA(s) that correspond to the one-time use eUICC public keys, otPK.eUICC.ECKA(s) used by the SM-DP+ 308 server(s) to encrypt the BPPs.

In some embodiments, one or more eSIM profiles installed from the encrypted BPPs include at least one provisioning eSIM 208 profile with limited functionality and configured for obtaining subsequently a fully functional eSIM 208 profile for a particular MNO. In some embodiments, the encrypted BPPs include at least one fully functional eSIM 208 profile configurable for cellular service with a particular MNO. In some embodiments, a user of the mobile wireless device 102 can initialize the mobile wireless device 102 and select and configure at least one fully functional eSIM 208 profile for cellular service with a particular MNO without use of wired or wireless data connectivity to enable the at least one fully functional eSIM 208 profile on the eUICC 108 of the mobile wireless device 102. In some embodiments, one or more interfaces between the BPP aggregator server 306 and one or more of the SM-DP+ 308 provisioning servers operate in accordance with one or more Global System for Mobile Association (GSMA) standards. In some embodiments, one or more interfaces between the BPP aggregator server 306 and the software (firmware) supplier 304 and/or the local provisioning server 310 at the manufacturing facility operate in accordance with a non-standardized, proprietary protocol. In some embodiments, the mobile wireless device 102 does not include a receiving bay for a UICC 118.

In some embodiments, one or more encrypted BPPs for an eUICC 108 are discarded by the local provisioning server 310 and replaced with one or more newly encrypted BPPs obtained from one or more MNO SM-DP+ 308 provisioning servers via the BPP aggregator server 306. Replacement of encrypted BPPs for the eUICC 108 can occur before the encrypted BPPs are loaded to the eUICC 108, such as to update information contained within and/or change the functionality of eSIM profiles included in the encrypted BPPs. In some embodiments, the local provisioning server 310 communicates with the BPP aggregator server 306 to re-generate one or more BPPs that include new and/or updated eSIM content, where the BPP aggregator server 306 communicates with appropriate MNO SM-DP+ 308 provisioning servers to obtain the updated encrypted BPPs. When the discarded BPPs have not yet been installed in the eUICC 108, the SM-DP+ 308 provisioning servers can re-use, in some embodiments, the previously used one-time use eUICC public keys, otPK.eUICC.ECKA(s), and associated xIDs when re-generating the newly updated BPPs. In some embodiments, the SM-DP+ 308 provisioning servers can re-use the previously used one-time use server private keys, otSK.DP.ECKA(s), when re-generating the newly updated BPPs. In some embodiments, the SM-DP+ 308 provisioning server uses one or more new one-time use server private keys, otSK.DP.ECKA(s), when re-generating the newly updated BPPs and provides the corresponding new one-time use server public keys, otPK.DP.ECKA(s) with the regenerated, newly updated BPPs to the BPP aggregator server 306 to provide to the local provisioning server 310 for subsequent uploading to the eUICC 108 of the mobile wireless device 102.

In some embodiments, one or more encrypted BPPs loaded to an eUICC 108 of a mobile wireless device 102 (and/or eSIM profiles extracted from the encrypted BPPs) are deleted from the eUICC 108, e.g., by the local provisioning server 310 while the mobile wireless device 102 is in the manufacturing facility, and replaced with one or more newly encrypted BPPs obtained from one or more MNO SM-DP+ 308 provisioning servers via the BPP aggregator server 306. eSIM profiles, previously installed from BPPs and then deleted, can be replaced by new eSIM profiles extracted from the newly encrypted BPPs for the eUICC 108. Deletion and replacement of BPPs and/or eSIM profiles on the eUICC 108 while the mobile wireless device 102 is in the manufacturing facility can be used to update information contained within and/or change the functionality of eSIM profiles loaded into the eUICC 108. In some embodiments, the local provisioning server 310 communicates with the BPP aggregator server 306 to re-generate one or more BPPs that include new and/or updated eSIM content, where the BPP aggregator server 306 communicates with appropriate MNO SM-DP+ 308 provisioning servers to obtain new and/or updated eSIM profiles included in updated encrypted BPPs. As the discarded profiles were installed in the eUICC 108, the SM-DP+ 308 provisioning servers cannot re-use the previously used one-time use eUICC public keys, otPK.eUICC.ECKA(s), and associated xIDs when re-generating the newly updated BPPs. Instead, the local provisioning server 310 can communicate with the BPP aggregator server 306 to cause one or more MNO SM-DP+ 308 provisioning servers to generate newly updated BPPs using new sets of credentials associated with the same eUICC 108, e.g., different xID values and eUICC public/private encryption key pairs than previously used. In some embodiments, some of the eUICC credentials generated by the software supplier 304 previously for the eUICC 108 remain available for use by the BPP aggregator server 306 to provide to the SM-DP+ 308 provisioning servers to generate the newly updated BPPs. In some embodiments, the SM-DP+ 308 provisioning server uses one or more new one-time use server private keys, otSK.DP.ECKA(s), when generating the newly updated BPPs and provides the corresponding new one-time use server public keys, otPK.DP.ECKA(s) with the regenerated, newly updated BPPs to the BPP aggregator server 306 to provide to the local provisioning server 310 for subsequent uploading to the eUICC 108 of the mobile wireless device 102.

Figure 4A:
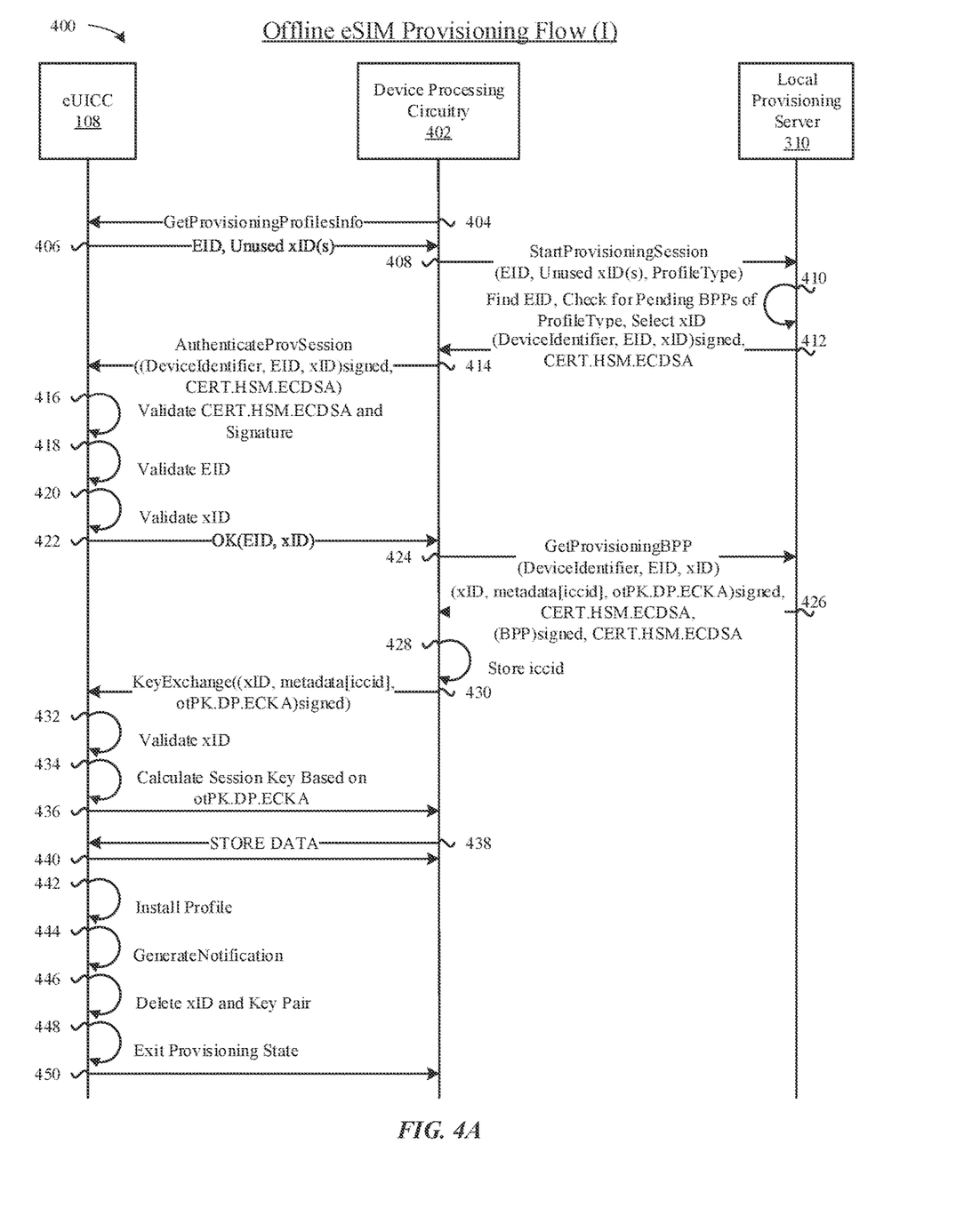
FIGS. 4A and 4B illustrate flowcharts of an example of phased off-line eSIM provisioning for a wireless device, according to some embodiments.
Figure 4B:
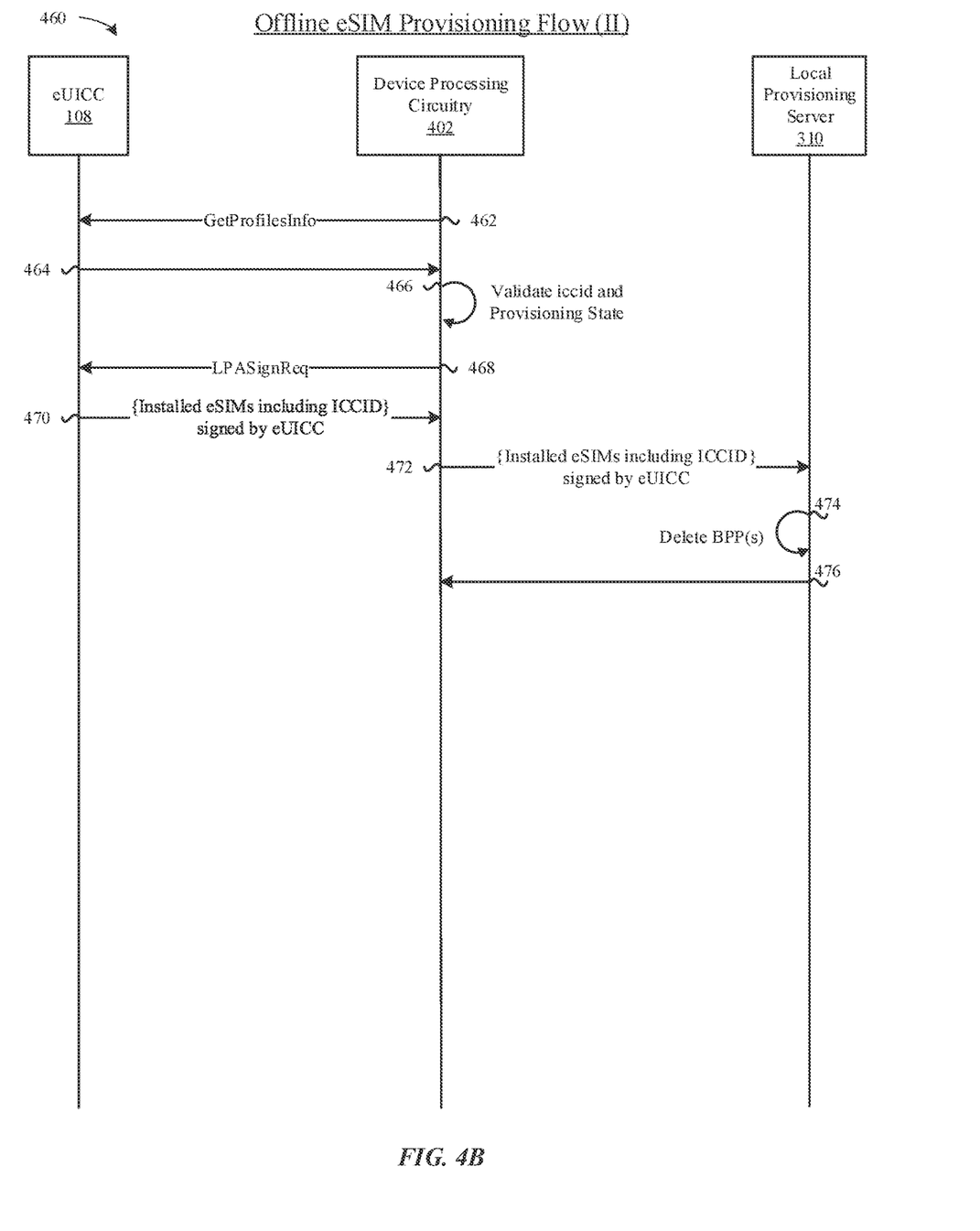

FIGS. 4A and 4B illustrate flowcharts 400, 460 of an exemplary off-line eSIM provisioning flow for obtaining and installing one or more provisioning bootstrap eSIMs 208 and/or fully functional eSIMs 208 on an eUICC 108 of a mobile wireless device 102. At 404, device processing circuitry 402 of the mobile wireless device 102 can send a GetProvisioningProfilesInfo message to the eUICC 108. At 406, the eUICC 108 can return an EID value for the eUICC 108 and a set of one or more available (unused) xID values. At 408, the device processing circuitry 402 of the mobile wireless device 102 can initiate off-line eSIM provisioning by sending a StartProvisioningSession message to the local provisioning server 310 co-located at the manufacturing facility as shown in FIG. 3. The StartProvisioningSession message can include the EID value of the eUICC 108, at least one of the available (unused) xID values, and a ProfileType for an eSIM 208 profile to be provisioned to the eUICC 108 of the mobile wireless device 102. Exemplary ProfileType values include i) a bootstrap provisioning profile, which can be specific to a particular MNO, to one or more MNOs, or generic for multiple MNOs, and ii) a fully functional cellular service eSIM for a particular MNO, such as AT&T, Verizon, etc. At 410, the local provisioning server 310 can check for pending BPPs of the ProfileType indicated in the StartProvisioningSession message based on the EID value of the eUICC 108. When there is at least one pending BPP of the ProfileType available for the eUICC 108 associated with the EID value, the local provisioning server 310, at 410, can select one of the xID values and subsequently, at 412, send a message to the device processing circuitry 402 of the mobile wireless device 102, the message including a DeviceIdentifier value, e.g., an international mobile equipment identifier (IMEI) value or a hardware serial number for the mobile wireless device 102. The message also includes the EID value for the eUICC 108 and the xID value selected by the local provisioning server 310. The message is signed based on a GSMA root certificate of the local provisioning server, e.g., a hardware security module (HSM) root certificate, CERT.HSM.ECDSA. The local provisioning server uses an HSM to host its own private key for signing messages that are sent to the eUICC 108. At 414, the device processing circuitry 402 of the mobile wireless device 102 sends to the eUICC 108 an AuthenticateProvSession message that includes the signed message from the local provisioning server 310 that includes the DeviceIdentifier value, EID value, and selected xID value and the root certificate CERT.HSM.ECDSA. At 416, the eUICC 108 validates the root certificate CERT.HSM.ECSDA and the signature of the signed message based on the certificate CERT.HSM.ECDSA. Note that the root certificate CERT.HSM.ECDSA was previously injected into the eUICC 108 by the hardware supplier 302 before providing the eUICC 108 to the manufacturing facility for assembly into the mobile wireless device 102. At 418, the eUICC 108 validates the EID value received. At 420, the eUICC 108 validates the selected xID value received. When all of the validations at 416, 418, and 420 pass successfully, the eUICC 108 sends an OK message to the device processing circuitry 402, the OK message including the EID value and the selected xID value to indicate to the device processing circuitry 402 permission to proceed with the off-line eSIM provisioning.

At 424, the device processing circuitry 402 sends a message to the local provisioning server 310 to obtain a BPP that includes an eSIM profile, e.g., the message can be a GetProvisioningBPP message that includes the DeviceIdentifier value, the EID value, and the previously selected xID value. The local provisioning server 310, at 426, can return to the device processing circuitry 402 a message that includes the selected xID value, metadata information, such as an ICCID value, of the eSIM profile included in the encrypted BPP included in the return message, and a one-time use SM-DP+ public key, otPK.DP.ECKA, that corresponds to a one-time use SM-DP+ private key, otSK.DP.ECKA, used previously for encryption of the BPP by the MNO SM-DP+ 308 provisioning server. The xID value, metadata, and one-time use SM-DP+ public key can be signed using the certificate CERT.HSM.ECDSA, a copy of which is also provided in the return message. The return message further includes the encrypted BPP signed with CERT.HSM.ECDSA. At 428, the device processing circuitry 402 can store at least a portion of the received metadata, e.g., the ICCID value. At 430, the device processing circuitry 402 provides to the eUICC 108 the xID value, metadata, e.g., ICCID value, and the one-time use SM-DP+ public key, otPK.DP.ECKA, in a signed KeyExchange message. At 432, the eUICC 108 validates the xID value. At 434, the eUICC 108 calculates a session key for the provisioning of the eSIM profile based on the one-time use SM-DP+ public key otPK.DP.ECKA that was generated by the SM-DP+ 308 provisioning server, passed transparently to the BPP aggregator server 306, then to the local provisioning server 310, and finally consumed by the eUICC 108. At 438, the eUICC 108 receives data from the device processing circuitry 402, the data including at least the encrypted BPP, from which the eUICC 108 can extract the eSIM 208 profile after decryption of the BPP. At 440, the eUICC 108 acknowledges receipt of the data from the device processing circuitry 402. At 442, the eUICC 108 installs the eSIM 208 profile extracted from the BPP, where the eSIM 208 profile can be i) a provisioning eSIM 208 profile with limited functionality for subsequently establishing a connection to an SM-DP+ 308 server and downloading a fully functional eSIM 208 profile, or ii) a fully functional (after appropriate configuration) eSIM 208 profile for access to cellular wireless services of an MNO associated with the SM-DP+ 308 provisioning server. At 444, the eUICC 108 generates an installation notification message, which may be sent later to the SM-DP+ 308 provisioning server that generated the BPP that included the installed eSIM 208 profile, so that the SM-DP+ 308 provisioning server learns that the eSIM 208 profile was installed successfully on the eUICC 108. At 446, the eUICC 108 deletes the xID value (as it's now been used) and also deletes the one-time use eUICC public/private key pair (also used in the off-line eSIM provisioning). At 448 the eUICC 108 exits the provisioning state and at 450 sends to the device processing circuitry 402 an indication of completion of installation of the eSIM 208 profile. At 462, the device processing circuitry 402 of the mobile wireless device 102 sends a GetProfilesInfo message to the eUICC 108 and obtains, in response at 464, information regarding eSIM 208 profiles installed on the eUICC 108 of the mobile wireless device 102. At 466, the device processing circuitry 402 validates the ICCID value that accompanied the BPP from which the eSIM 208 profile was extracted and the successful provisioning state of the eSIM 208 profile on the eUICC 108. At 468, the device processing circuitry 402 sends to the eUICC 108 an LPASignReq message and obtains, at 470 in response, a message that includes in its payload an indication of a set of one or more eSIMs 208, including their respective ICCID values, on the eUICC 108, where the message is signed by the eUICC 108. At 472, the device processing circuitry 402 forwards the signed payload message indicating installed eSIMs 208 on the eUICC 108 to the local provisioning server 310. At 474, the local provisioning server 310 can validate the signed message from the eUICC 108 and forwarded by the device processing circuitry 402 and delete one or more encrypted BPPs that included one or more eSIMs 208 installed on the eUICC 108 and indicated in the message. At 476, the local provisioning server 310 sends a confirmation message to the device processing circuitry 402 of the mobile wireless device 102.

Figure 4C:
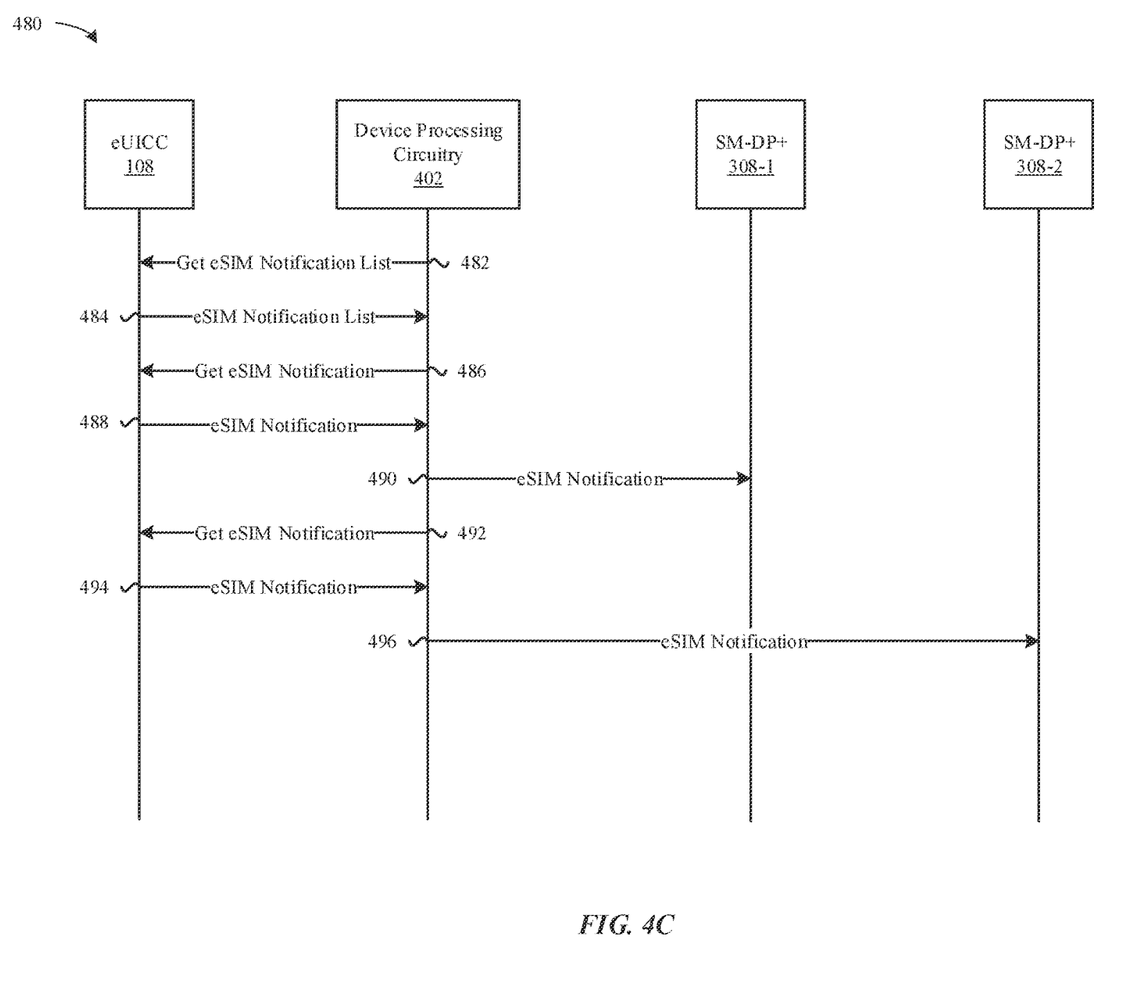
FIG. 4C illustrates a flowchart of an example of additional actions that can occur after or during initialization of the wireless device, according to some embodiments.

FIG. 4C illustrates a flowchart 470 of an example of additional actions that can occur after or during initialization of the mobile wireless device 102, e.g., after power up of the mobile wireless device 102 following (or during) purchase by a user. The device processing circuitry 402 of the mobile wireless device 102, at 482, can send a message to the eUICC 108 to retrieve a notification list for installed eSIMs 208, including limited functionality, bootstrap eSIMs 208 and/or fully functional eSIMs 208 on the eUICC 108. At 484, the eUICC 108 can return to the device processing circuitry 402 the eSIM notification list, which can include notifications for one or more eSIMs 208 associated with one or more SM-DP+ 308 provisioning servers of one or more MNOs. The device processing circuitry 402 can retrieve individual notifications for one or more of the eSIMs 208 indicated in the eSIM notification list and send the notifications to the appropriate, associated MNO SM-DP+ 308 provisioning server. As shown in FIG. 4C, for example, at 486, the device processing circuitry 402 sends a message to the eUICC 108 to obtain an eSIM notification for a first MNO SM-DP+ 308-1 provisioning server, receives the eSIM notification from the eUICC 108 at 488, and forwards the eSIM notification, at 490, to the first MNO DM-DP+ 308-1 provisioning server. At 490, device processing circuitry 402 sends a message to the eUICC 108 to obtain an eSIM notification for a second MNO SM-DP+ 308-2 provisioning server, receives the eSIM notification from the eUICC 108 at 494, and forwards the eSIM notification, at 496, to the second MNO SM-DP+ 308-2 provisioning server. The device processing circuitry 402 can repeat the notification retrieval and forwarding for multiple eSIMs 208 installed on the eUICC 108 to provide notifications for the installed eSIMs to multiple MNO SM-DP+ 308 provisioning servers. The eSIM notifications received by the device processing circuitry 402 can include network addresses, e.g., universal resource locator (URL) values, for the applicable MNO SM-DP+ 308 provisioning servers to which to forward the eSIM notifications.

When the off-line eSIM 208 provisioning flow included installation of a limited functionality, bootstrap eSIM 208 provisioning profile, the eUICC 108 of the mobile wireless device 102 can later use the bootstrap eSIM 208 profile to establish a secure data connection with an applicable SM-DP+ 308 provisioning server to obtain and install a fully functional eSIM 208 profile for access to cellular services of an MNO associated with the SM-DP+ 308 server. In some embodiments, the fully functional eSIM 208 profile can be installed over and replace the bootstrap eSIM 208 profile.

Figure 5:
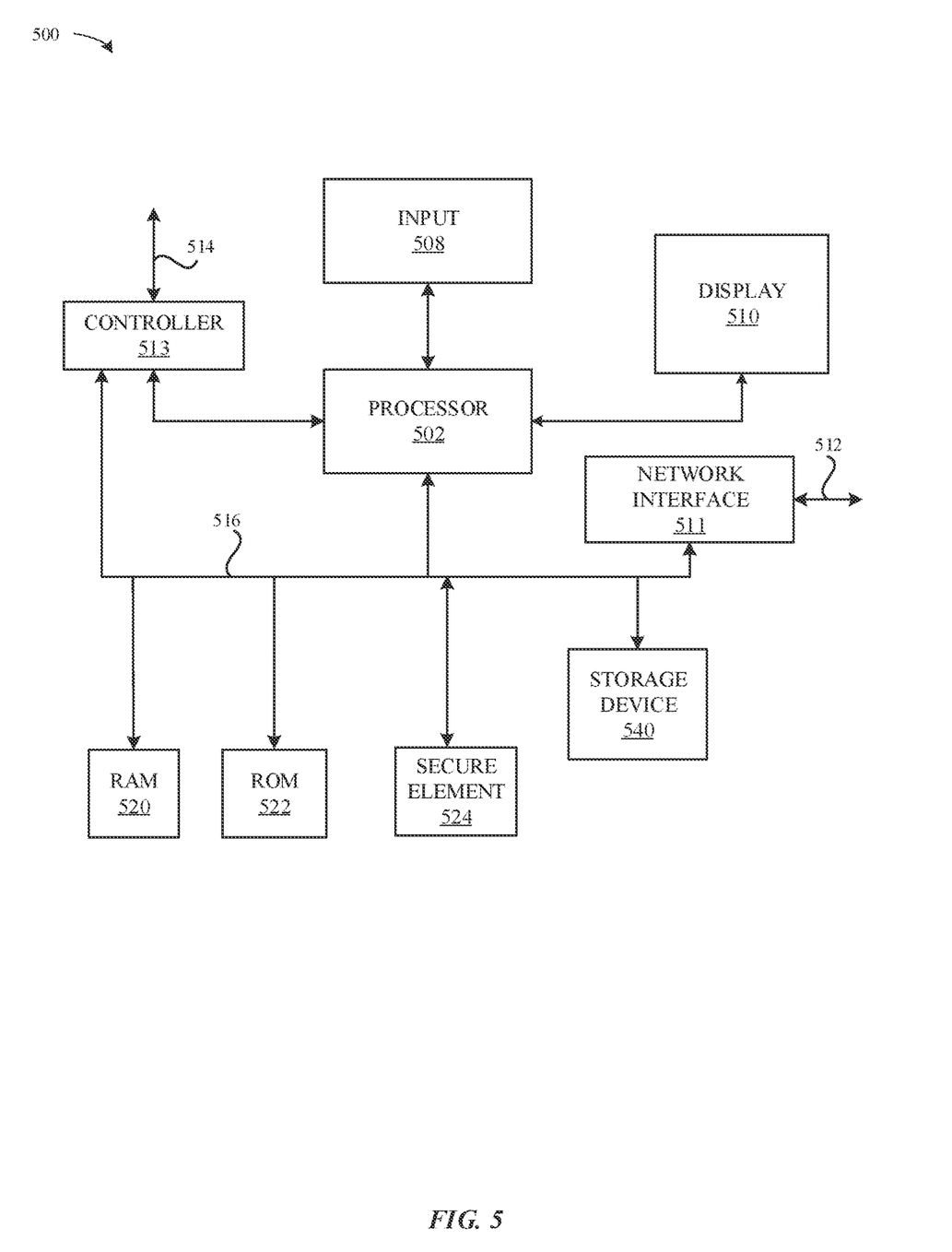
FIG. 5 illustrates a block diagram of exemplary elements of a mobile wireless device, according to some embodiments.

FIG. 5 illustrates a detailed view of a representative computing device 500 that can be used to implement various methods described herein, according to some embodiments. In particular, the detailed view illustrates various components that can be included in the mobile wireless device 102. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that communicatively couples to a data link 512. In the case of a wireless connection, the network/bus interface 511 can include a wireless transceiver.

The computing device 500 also includes a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500. The computing device 500 further includes a secure element 524, which can include an eUICC 108 on which to store one or more eSIMs 208 and/or a UICC 118 (physical SIM card).

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for notifying one or more mobile network operator (MNO) provisioning servers regarding provisioning status of one or more electronic subscriber identity modules (eSIMs) on an embedded universal integrated circuit card (eUICC) of a wireless device, the method comprising:
by the eUICC:
receiving, from device processing circuitry of the wireless device external to the eUICC, a first request for an eSIM notification list for eSIMs installed on the eUICC;
providing, to the device processing circuitry responsive to the first request, the eSIM notification list;
receiving, from the device processing circuitry, a second request for a notification for a first eSIM included in the eSIM notification list;
providing, to the device processing circuitry responsive to the second request, the notification for the first eSIM,
wherein:
the device processing circuitry forwards the notification for the first eSIM to a provisioning server of a first mobile network operator (MNO) associated with the first eSIM,
the notification for the first eSIM indicates to the provisioning server of the first MNO that the first eSIM is installed on the eUICC of the wireless device; and
the first eSIM was installed on the eUICC of the wireless device at a manufacturing facility for the wireless device.

2. The method of claim 1, wherein the notification for the first eSIM includes a network address of the provisioning server of the first MNO.

3. The method of claim 1, further comprising:
by the eUICC:
receiving, from the device processing circuitry, a third request for a notification for a second eSIM included in the eSIM notification list;
providing, to the device processing circuitry responsive to the third request, the notification for the second eSIM,
wherein:
the device processing circuitry forwards the notification for the second eSIM to a provisioning server of a second MNO associated with the second eSIM,
the notification for the second eSIM indicates to the provisioning server of the second MNO that the second eSIM is installed on the eUICC of the wireless device; and
the second eSIM was installed on the eUICC of the wireless device at the manufacturing facility for the wireless device.

4. The method of claim 3, wherein the first and second eSIMs were installed on the eUICC of the wireless device from bound profile packages (BPPs) stored at a local provisioning server that received the BPPs from a BPP aggregator server.

5. The method of claim 4, wherein the provisioning servers of the first and second MNOs individually provided the BPPs for the respective first and second eSIMs prior to manufacture of the wireless device.

6. The method of claim 1, wherein:
the first eSIM comprises a limited functionality bootstrap eSIM, and
the method further includes the processing circuitry of the wireless device using the limited functionality bootstrap eSIM to download and install a fully functional eSIM from the provisioning server of the first MNO to the eUICC.

7. The method of claim 1, wherein the first request for the notification list is received and the first notification forwarded to the provisioning server of the first MNO during an initialization procedure for the wireless device.

8. An embedded universal integrated circuit card (eUICC) of a wireless device comprising a processor and a memory storing instructions that, when executed by the processor, configure the eUICC to perform a set of actions including:
authenticating with a local provisioning server while the local provisioning server is co-located with the wireless device in a manufacturing facility;
obtaining, from the local provisioning server after authentication, an encrypted bound profile package (BPP) generated previously by a mobile network operator (MNO) provisioning server;
decrypting the BPP to obtain a profile; and
installing the profile in the eUICC,
wherein authentication with the local provisioning server is based at least in part on a root certificate pre-loaded in the eUICC during manufacture of the eUICC.

9. The eUICC of claim 8, wherein execution of the instructions further configure the eUICC to receive, from the local provisioning server with the BPP, a one-time use MNO provisioning server public key to use to decrypt the encrypted BPP.

10. The eUICC of claim 8, wherein the encrypted BPP was encrypted by the MNO provisioning server using a one-time use eUICC public key provided to the MNO provisioning server via the local provisioning server.

11. The eUICC of claim 10, wherein the one-time use eUICC public key is provided to the MNO provisioning server by the local provisioning server via a BPP aggregator server that aggregates BPPs for multiple MNOs.

12. The eUICC of claim 8, wherein execution of the instructions further configure the eUICC to:
provide to the local provisioning server a set of unused transaction identifier (xID) values for profile provisioning; and
obtain, from the local provisioning server with the encrypted BPP, an xID value from the set of unused xID values.

13. The eUICC of claim 12, wherein the eUICC validates the xID value prior to decrypting the BPP to obtain the profile.

14. The eUICC of claim 8, wherein the profile is installed in the eUICC without a real-time connection to the MNO provisioning server that generated the profile.

15. The eUICC of claim 8, wherein decrypting the encrypted BPP to obtain the profile comprises:
generating a session key based on a one-time use MNO provisioning server public key received from the local provisioning server with the encrypted BPP and a one-time use eUICC private key that corresponds to a one-time use eUICC public key provided to the MNO provisioning server to use to generate the encrypted BPP; and decrypting the encrypted BPP using the session key.

16. The eUICC of claim 8, wherein execution of the instructions further configure the eUICC to:

generate, after installation of the profile on the eUICC, an installation notification message to be sent by the wireless device to the MNO provisioning server that generated the encrypted BPP to indicate successful installation of the profile on the eUICC of the wireless device.

17. A wireless device comprising:

wireless circuitry comprising one or more antennas;

an embedded universal integrated circuit card (eUICC); and processing circuitry communicatively coupled to the eUICC and to the wireless circuitry, the processing circuitry comprising a processor and a memory storing instructions that, when executed by the processor, configure the wireless device to perform a set of actions including:

retrieving, from the eUICC, an electronic subscriber identity module (eSIM) notification list for eSIMs installed on the eUICC of the wireless device;

retrieving, from the eUICC for a first SIM included in the notification list, a first notification message generated previously during installation of the first eSIM on the eUICC while at a manufacturing facility for the wireless device; and forwarding, to a provisioning server of a first mobile network operator (MNO) that generated the eSIM, the first notification message to indicate successful installation of the eSIM on the eUICC of the wireless device.

18. The wireless device of claim 17, wherein the first notification message includes a network address of the provisioning server of the first MNO.

19. The wireless device of claim 17, wherein execution of the instructions further configured the wireless device to:

retrieve, from the eUICC for a second SIM included in the notification list a second notification message generated previously during installation of the second eSIM on the eUICC while at a manufacturing facility for the wireless device; and forwarding, to a provisioning server of a second MNO that generated the eSIM, the second notification message to indicate successful installation of the eSIM on the eUICC of the wireless device, wherein the second MNO is distinct from the first MNO.

20. The wireless device of claim 17, wherein the eSIMs installed on the eUICC of the wireless device were generated by respective provisioning servers and stored in encrypted bound profile packages (BPPs) at a local provisioning server at a manufacturing facility of the wireless device prior to installation of the eUICC in the wireless device.

* * * * *